(12) United States Patent
Thubert et al.

(10) Patent No.: US 11,240,672 B2
(45) Date of Patent: Feb. 1, 2022

(54) METHOD AND DEVICE FOR PERFORMING ENERGY DETECTION ON A SUBSET OF A WIRELESS CHANNEL

(71) Applicant: Cisco Technology, Inc., San Jose, CA (US)

(72) Inventors: Pascal Thubert, La Colle sur Loup (FR); Jerome Henry, Pittsboro, NC (US); Patrick Wetterwald, Mouans Sartoux (FR); Eric Levy-Abegnoli, Valbonne (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 131 days.

(21) Appl. No.: 16/133,826

(22) Filed: Sep. 18, 2018

(65) Prior Publication Data

US 2020/0092730 A1    Mar. 19, 2020

(51) Int. Cl.
*H04W 16/14*     (2009.01)
*H04W 24/08*     (2009.01)
(Continued)

(52) U.S. Cl.
CPC .......... *H04W 16/14* (2013.01); *H04B 17/318* (2015.01); *H04W 4/80* (2018.02); *H04W 24/08* (2013.01); *H04W 74/0825* (2013.01)

(58) Field of Classification Search
CPC .......... H04W 72/0446; H04W 72/042; H04W 72/046; H04W 72/0413; H04W 84/12; H04W 74/0833; H04W 24/10; H04W 72/14; H04W 72/1268; H04W 76/28; H04W 88/02; H04W 48/16; H04W 56/001; H04W 72/1289; H04W 76/15; H04W 16/14; H04W 72/085; H04W 74/085; H04W 88/08; H04W 28/0289; H04W 36/30; H04W 72/082; H04W 72/1215; H04W 28/18; H04W 28/24; H04W 24/02;
(Continued)

(56) References Cited

U.S. PATENT DOCUMENTS 6,760,671 B1    7/2004  Batcher et al.
7,136,655 B2    11/2006 Skafidas et al.
(Continued)

OTHER PUBLICATIONS

ZIH Corp, "Wi-Fi™ Friendly Mode", Jun. 2017, 2 pages.
(Continued)

*Primary Examiner* — Asad M Nawaz
*Assistant Examiner* — Najeeb Ansari (57) ABSTRACT

Various embodiments disclosed herein enable performing energy detection on a subset of a channel. In various embodiments, a method of performing energy detection is performed by a computing device. In various embodiments, the computing device includes a wireless transceiver, one or more processors, and a non-transitory memory. In various embodiments, the method includes performing energy detection on one or more overlapping portions of a first channel and a second channel. In some embodiments, the method includes determining whether a detected energy level from the energy detection satisfies a threshold. In some embodiments, the method includes transmitting a signal into the first channel based on the threshold being satisfied.

20 Claims, 9 Drawing Sheets

(51) Int. Cl.
*H04W 74/08* (2009.01)
*H04B 17/318* (2015.01)
*H04W 4/80* (2018.01)

(58) Field of Classification Search
CPC ............... H04W 36/08; H04W 52/146; H04W 52/0206; H04W 72/04
See application file for complete search history.

(56) References Cited

U.S. PATENT DOCUMENTS

| | | | |
|---|---|---|---|
| 7,983,298 | B2 | 7/2011 | Nanda et al. |
| 9,451,563 | B2 | 9/2016 | Zhou et al. |
| 9,571,257 | B2 | 2/2017 | Kwon |
| 9,585,104 | B2 | 2/2017 | Siomina et al. |
| 9,787,569 | B2 | 10/2017 | Somasundaram et al. |
| 2013/0028158 | A1* | 1/2013 | Lee .................. H04W 52/0206 370/311 |
| 2014/0269452 | A1* | 9/2014 | Papasakellariou ........................ H04W 72/0406 370/280 |
| 2014/0307569 | A1* | 10/2014 | Barbieri ................ H04L 5/0032 370/252 |
| 2017/0064557 | A1* | 3/2017 | Alsohaily ............. H04W 16/14 |
| 2017/0215171 | A1* | 7/2017 | Sun ....................... H04W 72/04 |
| 2017/0245211 | A1* | 8/2017 | Patil .................. H04W 52/0206 |
| 2018/0279216 | A1* | 9/2018 | Reial ..................... H04W 48/18 |
| 2018/0376423 | A1* | 12/2018 | Atefi .................. H04W 52/146 |
| 2019/0014537 | A1* | 1/2019 | Magnusson ........... H04L 5/0055 |
| 2019/0159155 | A1* | 5/2019 | Abedini ............ H04W 72/0446 |
| 2019/0254059 | A1* | 8/2019 | Gulati ............... H04W 72/1263 |
| 2020/0092730 | A1* | 3/2020 | Thubert ................. H04W 4/80 |

OTHER PUBLICATIONS

Sven Zacharias et al., "A Lightweight Classification Algorithm for External Sources of Interference in IEEE 802.15.4-Based Wireless Sensor Networks Operating at the 2.4 GHz", Hindawi Publishing Corporation, International Journal of Distributed Sensor Networks, vol. 2014, Article ID 265286, http://dx.doi.org/10.1155/2014/265286, Apr. 25, 2014, 24 pages.

Razvan Musaloiu-E. et al., "Minimising the effect of WiFi interference in 802.15.4 wireless sensor networks", Inderscience Enterprises Ltd., Int. J. Sensor Networks, vol. 3, No. 1, Jan. 2008, https://www.researchgate.net/publication/220201606_Minimising_the_effect_of_WiFi_interference_in_802154_wireless_sensor_networks, 12 pages.

Paria Jokar et al., "Intrusion Detection and Prevention for ZigBee-Based Home Area Networks in Smart Grids", https://ieeexplore.ieee.org/document/7544613, Aug. 16, 2016, 12 pages.

* cited by examiner

METHOD AND DEVICE FOR PERFORMING ENERGY DETECTION ON A SUBSET OF A WIRELESS CHANNEL

TECHNICAL FIELD

The present disclosure generally relates to wireless communication systems, and, in particular, to systems, methods, and devices for performing energy detection on a subset of a wireless channel.

BACKGROUND

The ongoing development of data networks often involves enabling greater connectivity by expanding the area covered by a network. Wireless access points (APs) simplify the deployment of network infrastructure equipment and the expansion of a network within a coverage area. As a result, various data networks, from local area networks (LANs) to wireless local area networks (WLANs), include a number of wireless APs. Wireless APs also facilitate client device mobility by providing relatively seamless access to a network throughout a coverage area.

Radio frequency (RF) interference is a problem when deploying wireless APs and/or wireless devices simultaneously or in close proximity to each other. As such, wireless devices that share channel bandwidth sometimes results in serious issues. For example, sharing channel bandwidth leads to degrading performance, dropping of packets, and malfunctioning of the wireless networks. To that end, wireless APs and devices that are deployed simultaneously or in close proximity to other wireless devices should minimize channel interference with other devices while also sharing the channel bandwidth.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the illustrative embodiments shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example embodiments described herein. While pertinent features are shown and described, those of ordinary skill in the art will appreciate from the present disclosure that various other features, including well-known systems, methods, components, devices and circuits have not been illustrated or described in exhaustive detail for the sake of brevity and so as not to obscure more pertinent aspects of the example embodiments described herein.

OVERVIEW

Various embodiments disclosed herein include methods, devices, and systems for performing energy detection on a subset of a channel. For example, in various embodiments, a method of performing energy detection is performed by a computing device. In various embodiments, the computing device includes a wireless transceiver, one or more processors, and a non-transitory memory. In various embodiments, the method includes performing energy detection on one or more overlapping portions of a first channel and a second channel. In some embodiments, the method includes determining whether a detected energy level from the energy detection satisfies a threshold. In some embodiments, the method includes transmitting a signal into the first channel based on the threshold being satisfied.

In accordance with some embodiments, a device includes one or more processors, a non-transitory memory, and one or more programs; the one or more programs are stored in the non-transitory memory, which, when executed by the one or more processors, cause the device to perform or cause performance of any of the methods described herein. In accordance with some embodiments, a non-transitory memory has stored therein instructions, which, when executed by one or more processors of a device, cause the device to perform or cause performance of any of the methods described herein. In accordance with some embodiments, a device includes: one or more processors, a non-transitory memory, and means for performing or causing performance of any of the methods described herein.

EXAMPLE EMBODIMENTS

In some previously available systems, filters may be used to reduce interference from other devices. However, such filters typically rely on inaccurate channel estimates and may also reduce the signal strength of the desired signal, which in turn decreases the signal-to-noise ratio. In other previously available systems, an operator may limit wireless interference by ensuring that wireless devices are turned off when in close proximity to other Internet-of-Things (IoT) devices. However, this is impractical because the process is entirely dependent on users manually turning off wireless devices that operate in the shared or unlicensed channel spectrum or setting the wireless devices to "flight/airplane" mode (e.g., a setting that, when activated, suspends radio-frequency transmission by the device).

In some previously available systems, devices that use a shared or unlicensed channel spectrum have protocols, such as a Listen-Before-Talk (LBT), that allow the devices to share the channel with other devices. According to the LBT protocol, a wireless transmitter first determines whether or not a wireless channel is being used before attempting to initiate a transmission. However, a problem arises when the LBT protocol is employed by a wireless transmitter operating on a first channel with a first bandwidth that overlaps with a second bandwidth of a second channel. For example, if the wireless transmitter performs energy detection on the first channel, energy within an overlapping portion of the first and second channels may not be accurately interpreted. This occurs because the overlapping portion of the first and second channel is small relative to the size of the first bandwidth.

By contrast, various embodiments disclosed herein disclose performing energy detection on one or more subsets of a wireless channel in order to alleviate inaccuracies. With reference to the example above, the wireless transmitter performs energy detection on the overlapping portion of the first and second channels in order to accurately interpret energy within the overlapping portion, and more accurately determine the usable throughput of the first channel. In some embodiments, a wireless transmitter determines whether a detected energy level satisfies a threshold characterizing an acceptable throughput level associated with the channel. For example, the wireless transmitter performs energy detection on the overlapping portion of the first and second channels. The wireless transmitter transmits a signal over the first channel in accordance with whether the detected energy level from the energy detection satisfies a threshold.

Energy detection refers to the ability of a receiver to detect an energy level present on the current channel (e.g., a preset frequency range) based on the noise floor, ambient energy, interference sources, unidentifiable wireless transmissions that may have been corrupted but can no longer be decoded, and/or the like. The energy detection samples the channel every slot time in order to determine if the energy on the channel still exists. To that end, the wireless AP performs energy detection in order to determine an interference level in the channel. This ultimately helps determine whether the channel is occupied.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier frequency-division multiple access (SC-FDMA), and other networks. The terms "network" and "system" are often used interchangeably. The techniques described herein may be used for wireless networks and radio technologies mentioned above as well as other wireless networks and radio technologies.

Figure 1:
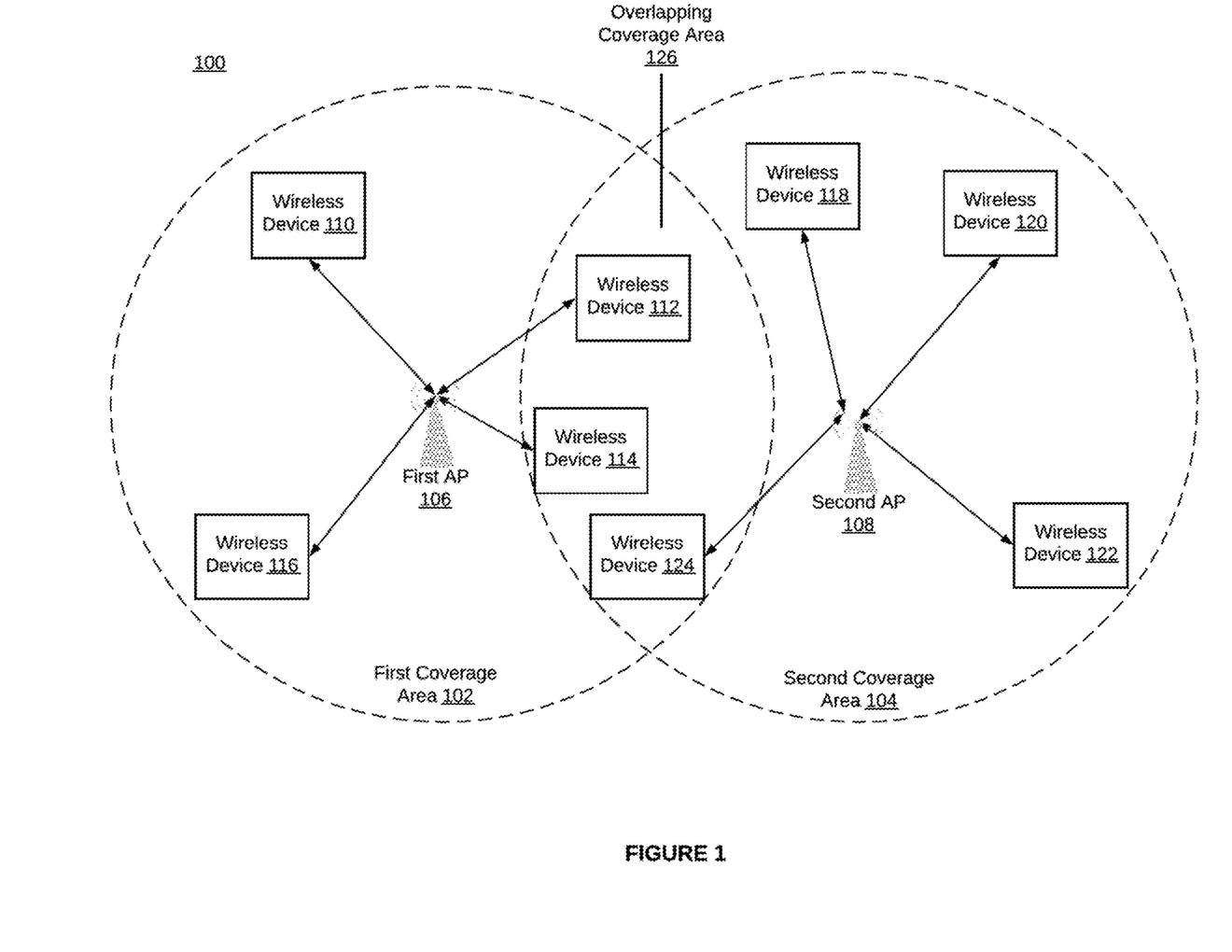
FIG. 1 is a schematic diagram of a system having two or more coverage areas that share an overlapping coverage area in accordance with some embodiments.

FIG. 1 is a schematic diagram of a data network environment 100 having two or more network coverage areas in accordance with some embodiments. While pertinent features are illustrated, those of ordinary skill in the art will appreciate from the present disclosure that various other features have not been illustrated for the sake of brevity and so as not to obscure more pertinent aspects of the example embodiments disclosed herein. To that end, as a non-limiting example, the data network environment 100 includes one or more network coverage areas such as a first coverage area 102 and a second coverage area 104 in FIG. 1. The data network environment 100 also includes a number of wireless devices 110, 112, 114, 116, 118, 120, 122, and 124. As shown in FIG. 1, the first coverage area 102 is included in a portion of the first network, and the second coverage area 104 is included in a portion of the second network. In some embodiments, the first coverage area 102 and the second coverage area 104 also includes a third overlapping coverage area 126 that is shared by a portion of the first network and a portion of the second network.

In various embodiments, the first coverage area 102 includes various wireless network nodes such as a first wireless AP 106 and the wireless devices 110, 112, 114, 116, and 124. In some embodiments, one or more of the wireless devices 110, 112, 114, 116, and 124 are client devices (sometimes referred to as user equipment in colloquial language) including hardware, software, firmware, and/or a suitable combination thereof for performing one or more functions. Example wireless devices include, without limitation, desktop computers, laptops, video game systems, tablets, mobile phones, media playback systems, wearable computing devices, internet protocol (IP) cameras, Voice-over-IP (VoIP) phones, sensors, access controllers (e.g., keycard readers), lighting controllers, security systems, building management systems, or the like.

The wireless devices 110, 112, 114, 116, 118, 120, 122, and 124 that co-exist in densely deployed scenarios potentially experience interference (e.g., crosstalk between radio transmitters operating in a same frequency band) from both other wireless devices in the same frequency channel (e.g., Wi-Fi, BLUETOOTH, etc.) and from other wireless devices operating using other protocols. For example, inter-operator interference is an issue because wireless APs and user equipment belonging to different operators can transmit and/or receive in the same frequency channels. In addition, in an unlicensed spectrum, different wireless communication protocols utilize different bands or segments of an electromagnetic channel spectrum in different manners. As such, the devices that operate in a shared or unlicensed channel spectrum should consider not only devices operating in a single network (e.g., controlled by a single operator), but also devices operating in different networks and devices operating using other networking protocols (e.g., IEEE 802.11g, IEEE 802.11n, IEEE 802.11ac, IEEE 802.15.4, BLUETOOTH, ZIGBEE, and/or the like).

In various embodiments, the first wireless AP 106 provides data, telecommunications, and/or other services to the wireless devices 110, 112, 114, and 116. For example, in some embodiments, the first coverage area 102 provides a communication channel that the wireless devices 110, 112, 114, and 116 utilize to access the first wireless AP 106. In some embodiments, the first coverage area 102 corresponds to a Wi-Fi network. In various embodiments, the first coverage area 102 corresponds to a short-range communication network with a communication range from several feet to a few hundred feet. In some embodiments, the first coverage area 102 operates in accordance with the IEEE 802.15.4 standard (e.g., ZIGBEE). In other words, in some embodiments, the first coverage area 102 utilizes a radio access technology (RAT) that corresponds to the IEEE 802.15.4 standard.

In various embodiments, the second coverage area 104 includes various wireless network nodes such as a second wireless AP 108 and wireless devices 112, 114, 118, 120, 122, and 124. In some embodiments, the second wireless AP 108 provides data, telecommunications, and/or other services to the wireless devices 118, 120, 122, and 124. For example, in some embodiments, the second coverage area 104 provides a communication channel that the wireless devices 118, 120, 122, and 124 utilize to access the second wireless AP 108. In some embodiments, the second coverage area 104 corresponds to a Wi-Fi network. In various embodiments, the second coverage area 104 corresponds to a short-range communication network with a communication range from several feet to a few hundred feet. In some embodiments, the second coverage area 104 operates in accordance with the IEEE 802.15.4 (e.g., ZIGBEE) standards. In other words, in some embodiments, the second coverage area 104 utilizes a RAT that corresponds to the IEEE 802.15.4 standard.

In some embodiments, the first wireless AP 106 provides a first coverage area 102 for a first system or network, such as a packet-based system, although not limited to such. Similarly, in some embodiments, a second wireless AP 108 provides a second coverage area 104 for a second system or network. For purposes of illustration, FIG. 1 shows a common environment where an overlapping coverage area 126 is shared between at least the two systems implemented by the first coverage area 102 and the second coverage area 104. It is noted that the geometries and areas illustrated are merely examples, and the data network environment 100 connotes any environment where spectrum is capable of being shared among at least a primary system and at least one secondary system.

According to some embodiments, each system (e.g., the first and second coverage areas 102 and 104) is operable for communication to one or more devices by a first wireless device (110, 112, 114, or 116) in communication with the first wireless AP 106 and a second wireless device (118, 120, 122, or 124) in communication with the second wireless AP 108. Each wireless device is respectively capable of communication with the first and second wireless APs 106 and 108 in both a downlink channel and an uplink channel.

In some embodiments, the first coverage area 102 utilizes a first RAT, and the second coverage area 104 utilizes a second RAT that is different from the first RAT. For example, in some embodiments, the first wireless AP 106 provides a first network that differs from a second network provided by a second wireless AP 108. In some embodiments, the operation of wireless devices in certain portions of a shared or unlicensed spectrum may experience interference from another RAT using the spectrum. For example, Long-Term-Evolution (LTE) (or some other wireless wide area network technology) and another access technology (e.g., one specified by IEEE 802.11 (Wi-Fi), 802.15.1 (BLUETOOTH), 802.15.4 (ZIGBEE), or the like) may operate in an unlicensed spectrum. In various embodiments, interference from the second RAT on a signal using the first RAT within the shared communication channel may degrade the signal quality of the signal using the first RAT.

Unlicensed spectrum, in particular the 2.4 Gigahertz (GHz) band, can become rapidly saturated with Wi-Fi to the point that industrial protocols (e.g., International Society of Automation (ISA) 100.11a and Wireless Highway Addressable Remote Transducer Protocol (WirelessHART)) cannot operate satisfactorily. For example, in a factory environment, an office may be located in close proximity to a production zone of the factory environment. In this example, the office uses Wi-Fi for multiple devices (e.g., printers, security cameras, cellular phones, wireless laptops, etc.) that operate in the 2.4 GHz band, and the production zone contains IoT devices (e.g., barcode scanners, industrial equipment, etc.) that also operate in the 2.4 GHz band. The IoT devices that operate have low transmit power compared to the Wi-Fi devices that have a high transmit power. As a result, other 2.4 GHz wireless networks, such as IEEE 802.11, easily interfere with the IEEE 802.15.40 based networks. With reference to the above example, this is an issue when critical applications do not reside on Wi-Fi devices in the office, but rather on the IoT devices that are located in the production zone. For example, ordinary business functions such as sending email or web browsing may be less critical than industrial processes running on the industrial protocols. As such, 2.4 GHz Wi-Fi is often banned by policy around large production floors where the industrial protocols are critical for operation. However, in other settings where 2.4 GHz Wi-Fi is not banned, co-existence is a major concern.

Figure 2A:
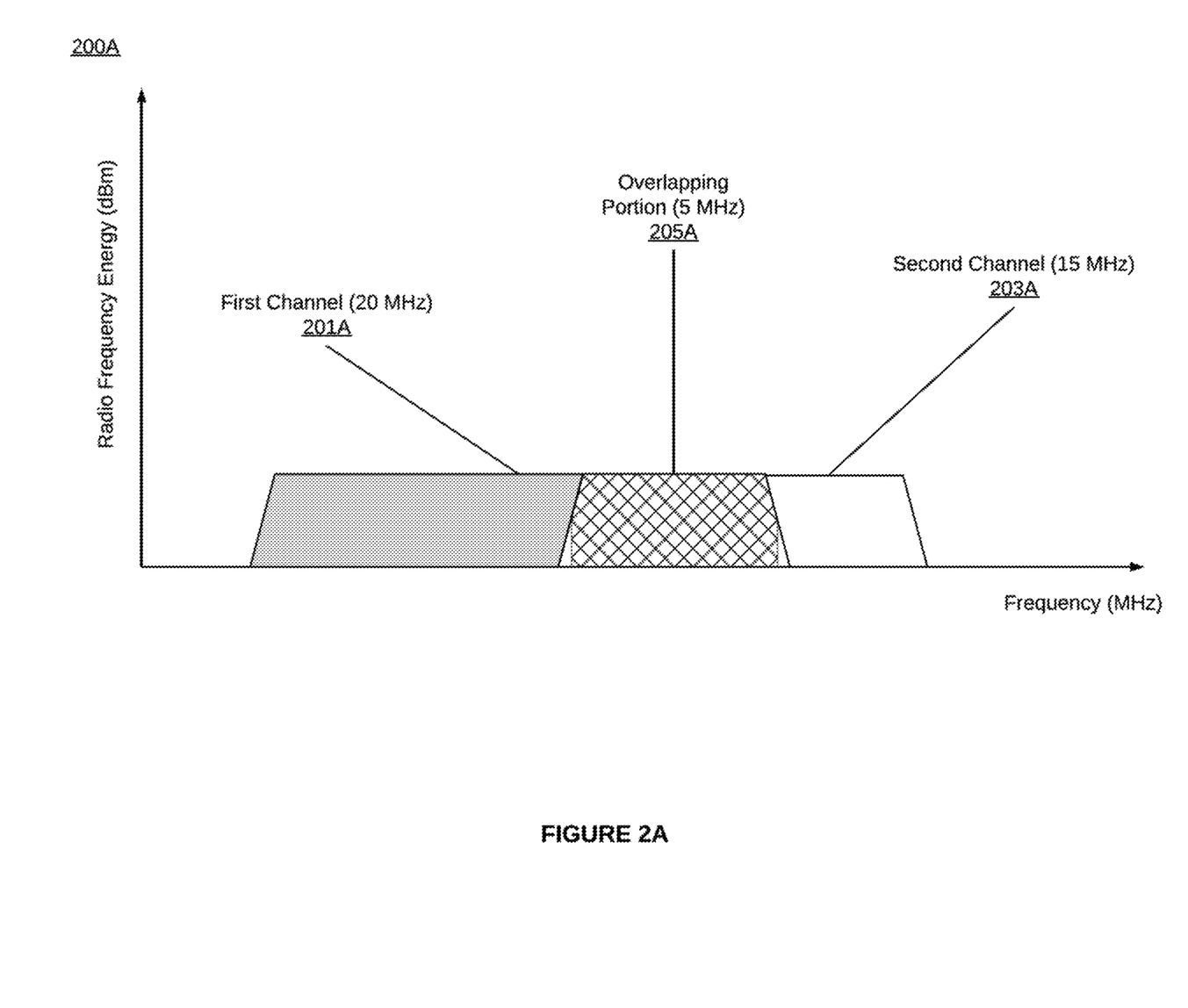
FIG. 2A is a diagram illustrating a simplified radio frequency (RF) channel spectrum plot of two channels with an overlapping portion in accordance with some embodiments.

As an example provided to illustrate the challenges involved in performing energy detection on an overlapping portion of a first channel and a second channel, FIG. 2A illustrates a simplified RF spectrum plot 200A according to some embodiments. As shown in FIG. 2A, the RF spectrum plot 200A includes a first channel 201A, a second channel 203A, and an overlapping portion 205A of the first channel and second channel. In some embodiments, the overlapping portion 205A is smaller than the first channel 201A. Those of ordinary skill in the art will appreciate that the simplified RF spectrum plot 200A includes merely the basic information typically available in an RF spectrum plot. So while some specific features are illustrated, those of ordinary skill in the art will appreciate from the present disclosure that various features have not been illustrated for the sake of brevity and so as not to obscure the more pertinent aspects of the RF spectrum plot 200A. Nonetheless, those of ordinary skill in the art would appreciate that the RF spectrum plot 200A does include enough information to illustrate the relationship between the size of the first channel and size of the second channel.

Figure 2B:
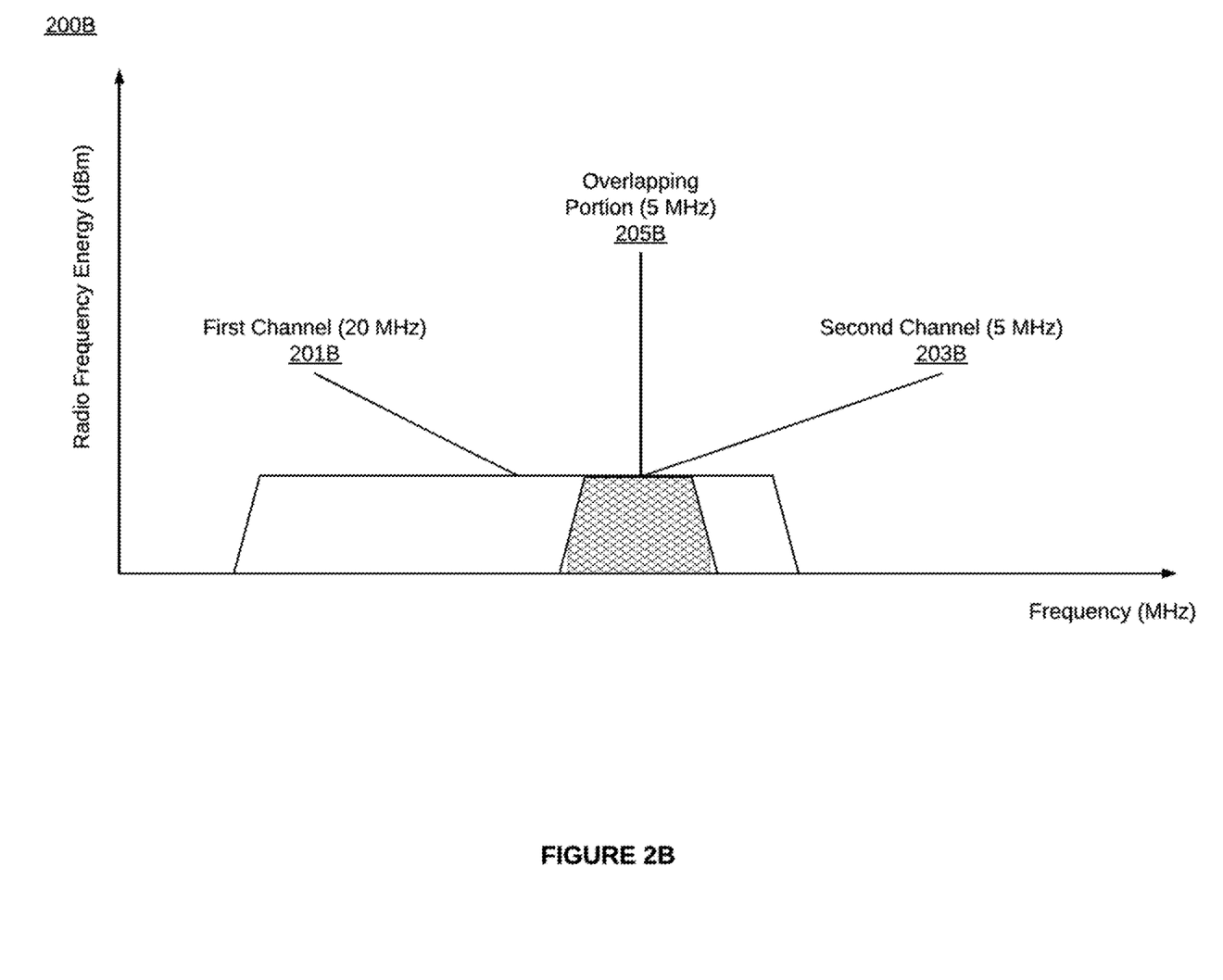
FIG. 2B is a diagram illustrating another simplified RF channel spectrum plot of two channels with an overlapping portion that is subsumed by a first channel in accordance with some embodiments.

FIG. 2B illustrates another simplified RF spectrum plot 200B according to some embodiments. As shown in FIG. 2B, the RF spectrum plot 200B includes a first channel 201B, a second channel 203B, and an overlapping portion 205B of the first channel and second channel in accordance with some embodiments. In FIG. 2B, the second channel 203B (e.g., overlapping portion 205B of the first and second channel) is subsumed by the first channel 201B. This is in contrast to FIG. 2A where a portion of the second channel 203A (e.g., 10 MHz) is not included in the overlapping portion 205A of the first and second channels. As shown in FIG. 2A, only a portion of the second channel 203A (e.g., 5 MHz) overlaps with the first channel 201A. In some embodiments, the first channel may subsume a plurality of overlapping portions of the first and second.

Figure 3:
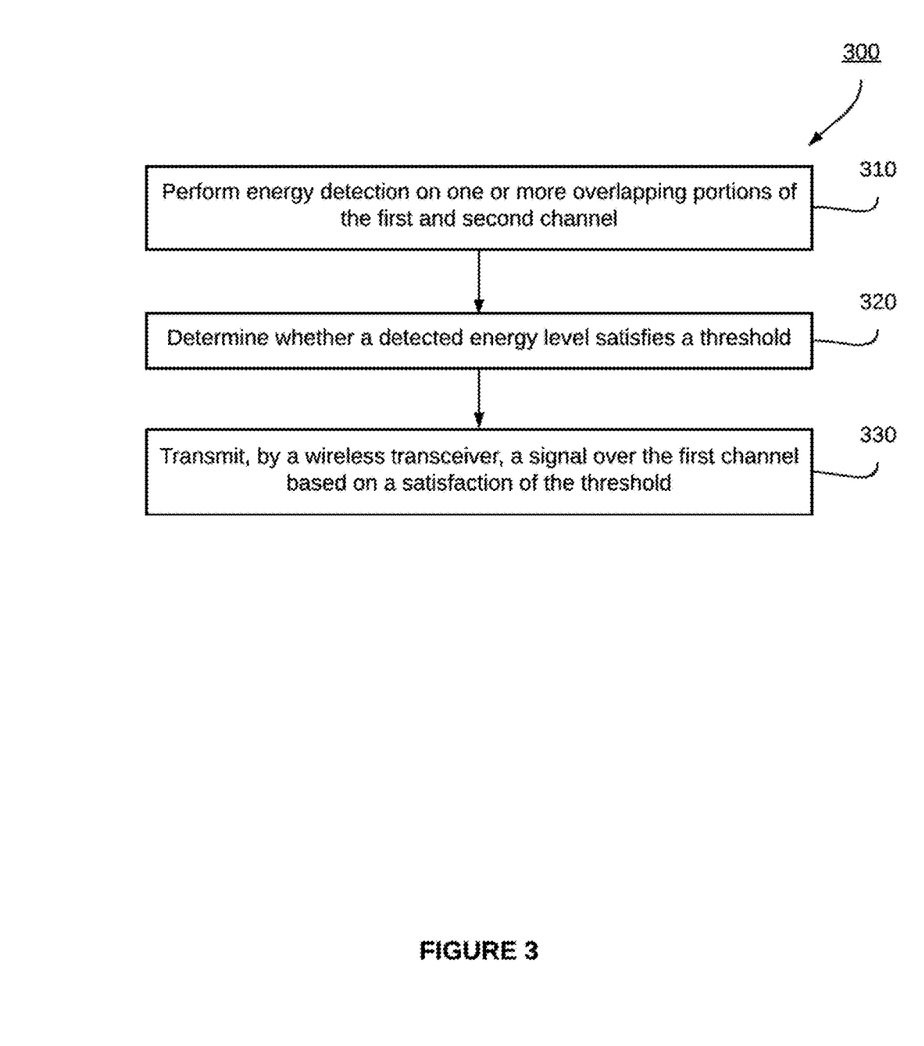
FIG. 3 is a flowchart representation of a method of performing energy detection on a subset of a channel in accordance with some embodiments.

FIG. 3 is a flowchart representation of a method 300 of performing energy detection on a subset of a channel in a network environment (e.g., the data network environment 100 shown in FIG. 1) in accordance with some embodiments. In some embodiments, the method 300 is performed by a device with one or more processors and non-transitory memory such as a first wireless AP 106 or a second wireless AP 108 in FIG. 1. In some embodiments, the method 300 is implemented as a set of computer readable instructions that are executed at a wireless AP or device. Briefly, the method 300 includes: performing energy detection on one or more overlapping portions of a first and second channel, determining whether a detected energy level satisfies a threshold, and transmitting, by a wireless transceiver, a signal over the first channel.

To that end, as represented by block 310, in some embodiments the method 300 includes performing energy detection on one or more overlapping portions of the first and second channels (e.g., the overlapping portion 205A shown in FIG. 2A and the overlapping portion 205B shown in FIG. 2B). In some embodiments, the size of the overlapping portions of the first and second channels is smaller than the first channel. In some embodiments, the first channel subsumes the overlapping portion of the first and second channels (e.g., the overlapping portion 205B shown in FIG. 2B). In some embodiments, the first and second channels are associated with the same RAT. In some embodiments, the first and second channels are associated with different RATs.

As represented by block 320, in some embodiments, the method 300 includes determining whether a detected energy level satisfies a threshold. In some embodiments, the threshold characterizes an acceptable throughput level associated with the first channel. According to some embodiments, the method includes determining whether or not to transmit a signal over a wireless channel by performing energy detection on one or more overlapping portions of the first and second channels in order to assess the actual throughput of the first channel.

As represented by block 330, in some embodiments, the method 300 includes transmitting, by a wireless transceiver, a signal over the first channel based on satisfaction of the threshold. In some embodiments, the method 300 includes allowing the wireless AP to transmit a signal over a channel when the detected energy level satisfies an acceptable throughput level associated with the channel. In other embodiments, the method 300 does not allow the wireless AP to transmit the signal over the wireless channel in response to the detected energy level not satisfying the acceptable throughput level associated with the channel.

In some embodiments, the method 300 includes preventing the wireless AP from transmitting a signal over a channel when the detected energy level does not satisfy an acceptable throughput level associated with the channel. A more detailed example of an embodiment of the energy detection process is described below with reference to the flowchart illustrated in FIG. 4.

Figure 4:
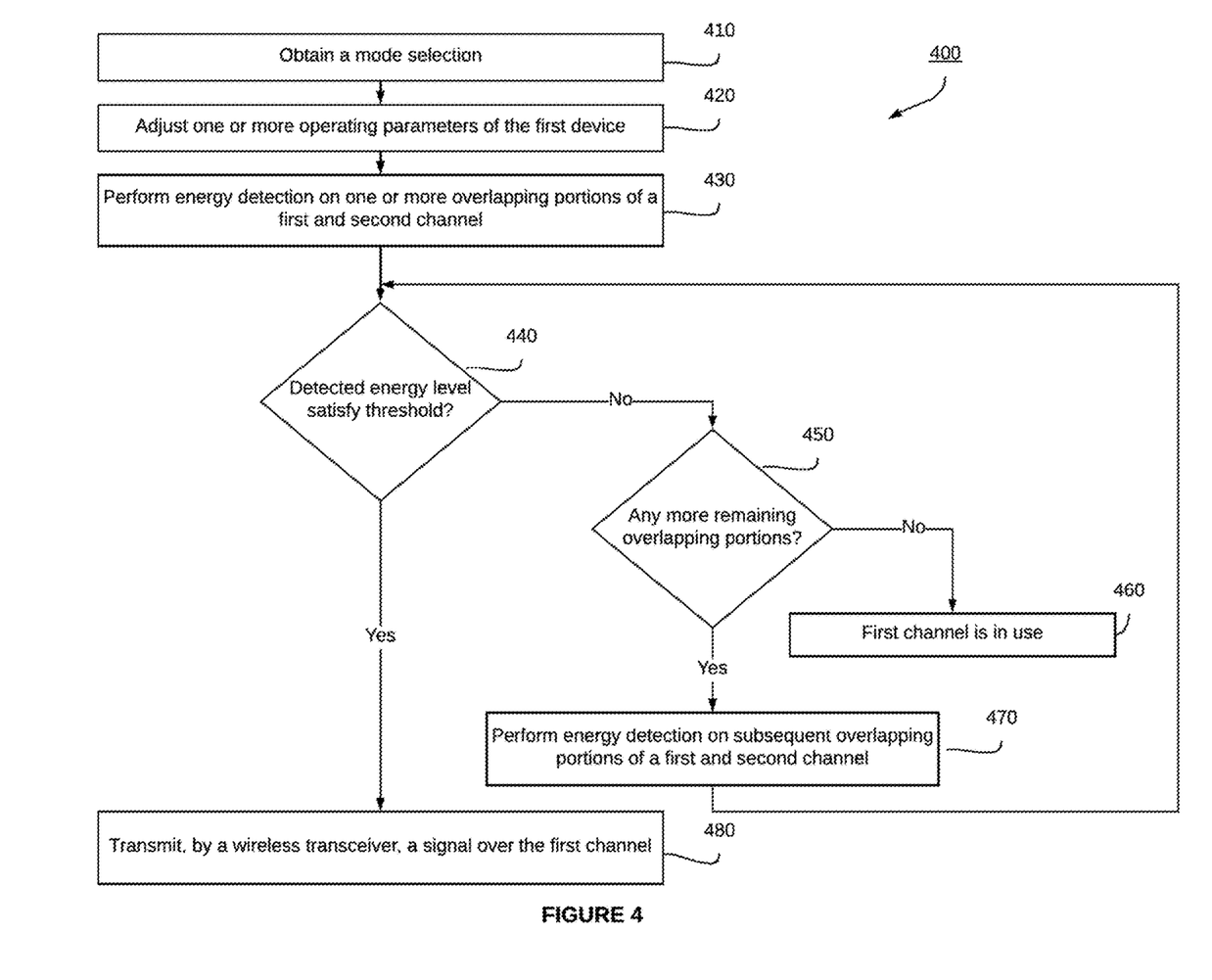
FIG. 4 is a flowchart representation of a method of performing energy detection on one or more overlapping portions of a first channel and a second channel in accordance with some embodiments.

FIG. 4 is a flowchart representation of a method 400 of performing energy detection on one or more overlapping portions of a first and second channel in accordance with some embodiments. In some embodiments, the method 400 is performed by a device with one or more processors and non-transitory memory such as a first wireless AP 106 or a second wireless AP 108 shown in FIG. 1 and a wireless AP shown in FIG. 8. In some embodiments, the method 400 is performed by a wireless AP in order to determine whether or not to transmit a signal over a wireless channel. In some embodiments, the method 400 is implemented as a set of computer readable instructions that are executed at the wireless AP. Briefly, the method 400 includes: obtaining a mode selection, adjusting operating parameters of the first device based on the selected mode, performing energy detection on the one or more overlapping portions of a first and second channel, determining whether a detected energy level satisfies a threshold, and determining whether there are any more remaining overlapping portions to analyze.

To that end, as represented in block 410, in some embodiments, the method 400 includes obtaining a mode selection. In some embodiments, a user or an administrator selects the mode. For example, the user or administrator may be prompted with a user interface that allows the user or administrator to select and configure different mode selections. As a non-limiting example, with further reference to FIG. 5, the various mode selections may correspond to a "somewhat gentle" mode, a "gentle" mode, or a "very gentle mode." In some embodiments, the mode selection may also adjust an acceptable throughput level associated with the first channel. To that end, the mode selection can be parameterized to be more sensitive to lower or reduced energy levels based on the gentleness setting by lowering the acceptable throughput level. In some embodiments, a client or wireless AP can be set to a particular mode. However, those skilled in the art will appreciate that there are many ways of selecting a mode selection. For the sake of brevity, an exhaustive listing of all such methods of selecting is not provided herein. As mentioned above, as a non-limiting example, with further reference to FIG. 5, the various mode selections may correspond to a "somewhat gentle" mode, a "gentle" mode, or a "very gentle mode."

As represented by block 420, in various embodiments, the method 400 includes adjusting one or more operating parameters of the first device based on the selected mode. Depending on a "gentleness" setting, a device or wireless AP performs energy detection on various combinations of overlapping channels of the first and second channels around the center frequency of the first channel.

In some embodiments, a sensitivity mode sets the number of overlapping portions of a first channel and second channel that the wireless AP will perform energy detection on. Generally, the mode can be set to different levels of sensitivity according to how many overlapping channels of the first channel and second channel are present within the bulk of the first channel. This is in contrast to the LBT protocol, which averages results of energy detection over the bulk of the first channel. In some embodiments, in a "gentle" mode, a wireless AP performs energy detection selectively on four overlapping portions of a channel. In some embodiments, in a "somewhat gentle" mode, a device or wireless AP performs energy detection selectively on two overlapping portions of a channel. In some embodiments, in a "very gentle" mode, a device or wireless AP performs energy detection selectively on six overlapping portions of a channel.

As represented by block 430, in some embodiments, the method includes performing energy detection on one or more overlapping portions of the first and second channels. As one example, with reference to FIG. 5 below, a wireless AP performs energy detection on two, four, or six IEEE 802.15.4 channels around the center frequency of the Wi-Fi channel based on a selection of the sensitivity mode.

In some embodiments, the wireless AP logs a detected energy level in a transmission log. In some embodiments, a learning machine uses the transmission log as an input in order to determine energy detection signatures that indicate transmissions that a node may interfere with. In some embodiments, the energy detection signatures are programmed in a wireless AP in order to recognize programmed energy detection signatures during subsequent energy detections. As will be described in detail below with reference to FIG. 7, the wireless AP logs wireless transmissions with a precise time that can later be correlated with a wireless protocol schedule. For example, a transmission log entry that indicates "no energy detection, Wi-Fi transaction at time=1" and "802.15.4 transaction fail at time=1" signals to the learning machine that the detection was not sensitive enough and the energy detection threshold or range of 802.15.4 bands where the detection occurred should be changed.

As represented by block 440, in some embodiments, the method 400 includes determining, based on the energy detection measurement, whether a detected energy level satisfies a threshold. In some embodiments, the threshold defines an acceptable throughput level associated with the first channel. In some embodiments, if the detected energy level threshold satisfies the threshold ("Yes" path from block 440), then the method 400 proceeds to block 480.

As represented by block 480, in some embodiments, the method 400 includes transmitting a signal over the first channel by a wireless transceiver. For example, a wireless AP may transmit a signal in response to determining that the frequency or channel is sufficiently free of interference (e.g., when the detected energy level value is less than or not satisfies the energy-level detection threshold). Moreover, in some embodiments, when the wireless AP transmits the signal over the first channel, the transmission includes a channel frequency reservation or channel usage message.

On the other hand, if the detected energy level threshold is not found ("No" path from block 440), the method proceeds to block 450. As represented in block 450, in some embodiments, the method 400 includes determining whether there are any more remaining overlapping portions to perform energy detection on within the first channel. If there are overlapping portions remaining ("Yes" path from block 450), then the method proceeds to block 470.

As represented by block 470, in some embodiments, the wireless AP performs energy detection on subsequent overlapping portions of the first and second channels to continue the evaluation process. On the other hand, if there are no more remaining overlapping portions of the first and second channels ("No" path from block 450), then the method proceeds to block 460. As represented in block 460, in some embodiments, the wireless AP will not transmit a signal over the first channel because the method 400 determines that the first channel is in use.

Figure 5:
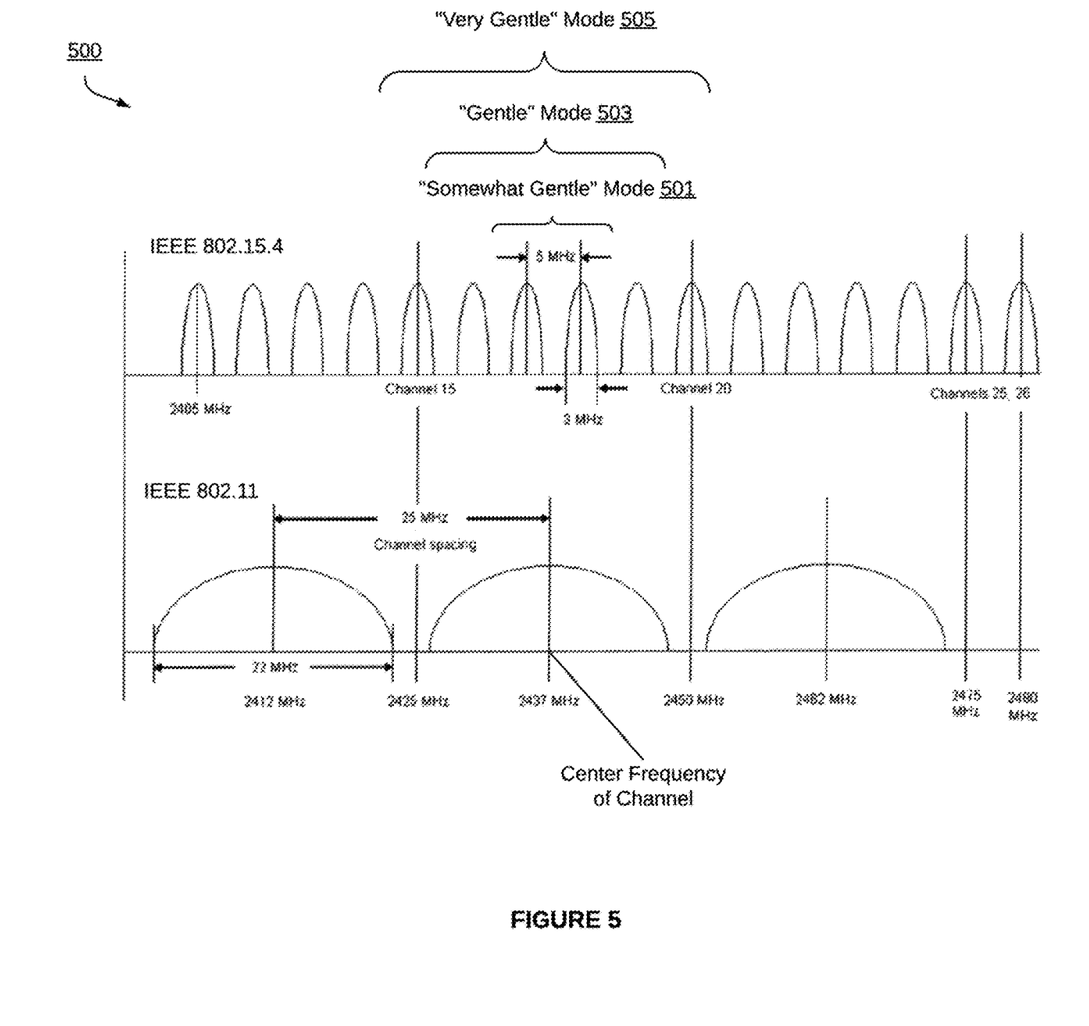
FIG. 5 is a diagram illustrating performing energy detection on various combinations of overlapping portions of a first channel and a second channel in accordance with some embodiments.

FIG. 5 is a simplified channel diagram 500 showing a RF channel spectrum of IEEE 802.15.4 (ZIGBEE) against IEEE 802.11 (Wi-Fi) in accordance with some embodiments. Those skilled in the art will appreciate that the simplified channel diagram 500 includes merely the basic information typically available in a channel diagram. So while certain specific features are illustrated, those skilled in the art will appreciate from the present disclosure that various other features have not been illustrated for the sake of brevity and so as not to obscure more pertinent aspects of the simplified channel diagram 500 as they are used to describe more prominent features of the various embodiments disclosed above. Nevertheless, those skilled in the art would appreciate that the simplified channel diagram 500 does include enough information to illustrate the differences between the channel spectrums of two different RATs (e.g., Wi-Fi and ZIGBEE). For example, as discussed in greater detail below, the simplified channel diagram 500 illustrates the differences between the arrangements and channel bandwidths of Wi-Fi and ZIGBEE.

In FIG. 5, the channel diagram 500 is a graphical representation depicting how much energy and at what frequencies a radio operates. The Y-axis corresponds to the RF energy or power, and the X-axis corresponds to the frequency. Because both the ZIGBEE and the Wi-Fi standards are "spread spectrums," they do not operate on a single radio channel. Instead, the ZIGBEE and the Wi-Fi standards occupy frequency bands that result in the hump shape shown in the channel diagram 500. A radio channel assignment is made by reference to the center frequency of the channel (i.e., the center of the hump). As is apparent in FIG. 5, the Wi-Fi channels are much wider in frequency than the ZIGBEE channels. This means that Wi-Fi occupies more RF spectrum per channel than ZIGBEE.

Referring to FIG. 5, a ZIGBEE signal, which follows the IEEE 802.15.4 standard, provides 16 channels in the 2.4 GHz band where the bandwidth of each channel is 3 megahertz (MHz). The central frequency of channel 1, which is the first channel of the 16 channels, is 2405 MHz, and the central frequency of each channel is placed at ascending 5 MHz intervals.

In contrast, a Wi-Fi signal, which follows the IEEE 802.11 standard, provides 13 channels in the 2.4 GHz band where the bandwidth of each channel is 22 MHz. The central frequency of the first channel of the 13 channels is 2412 MHz, and the central frequency of each channel is placed at ascending 25 MHz intervals.

The IEEE 802.15.4 standard supports short distance communications such as a home, office, mid-size factories, or the like. Thus, the channel bandwidth of the IEEE 802.15.4 is significantly affected by wireless channel interference because the IEEE 802.15.4 channel bandwidth size of 3 MHz compared to the IEEE 802.11 channel bandwidth size of 22 MHz. For example, when an 802.15.4 sensor network and a Wi-Fi network overlap and are set to use adjacent frequency bands, interference is generated in the wireless signals. The interference causes irregular frame transmission delays in the sensor nodes of the 802.15.4 sensor networks and communication in the industrial protocols such as ISA 100.11a and Wireless HART become difficult. In such an interference environment, there is a need for a method to avoid interference in order to secure reliable wireless communication of the 802.15.4 sensor networks Therefore, as shown in FIG. 5, one channel for Wi-Fi communication overlaps with four or five channels for ZIGBEE communication. The channel overlapping between other communication systems becomes the cause of the wireless communication interference in the ZIGBEE sensor network.

As mentioned above, a mode selection configures the wireless AP to perform energy detection on various combinations of the overlapping portions of the first and second channels. Any client or wireless AP can be set to a particular "gentle" mode. In addition, the wireless AP can also signal to any device communicating in the wireless network to select the particular "gentle" mode. The "gentle" mode configures the wireless AP to perform energy detection on various combinations of the overlapping channels. Depending on the gentleness setting, energy detection can be performed over various overlapping portions of the first and second channels around the center frequency of the first channel. This is in contrast to other available systems, for example, which either uses a specialized chip or averages the energy detection over a whole Wi-Fi channel (20 MHz).

As shown in FIG. 5, various "gentle" modes depict various combinations of overlapping channels to analyze. In some embodiments, a "somewhat gentle mode" 501 configures the wireless AP to perform energy detection over two overlapping channels around the center frequency of a channel. In some embodiments, a "gentle" mode 503 configures the wireless AP to perform energy detection over four overlapping channels around the center frequency of a channel. In some embodiments, a "very gentle" mode 505 configures the wireless AP to perform energy detection over six overlapping channels around the center frequency of the channel. While specific examples are highlighted above, for both the mode settings and corresponding various combinations of the overlapping portion of the first and second channels, those skilled in the art will appreciate that the modes and combination of the overlapping portion of the first and second channels can be defined using any number of overlapping portions of the first and second channels. As such, the specific examples discussed above are not meant to be limiting.

Figure 6:
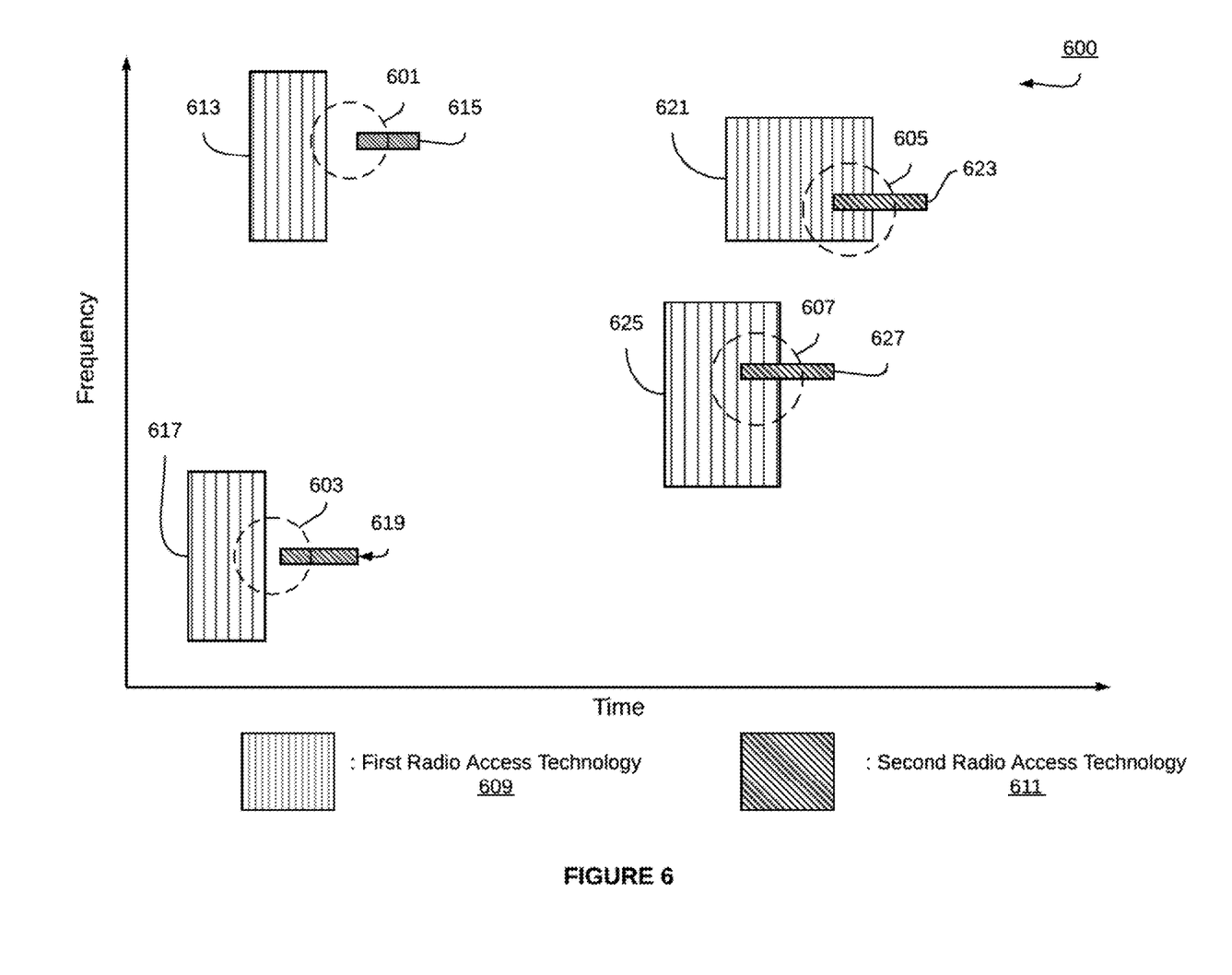
FIG. 6 is a diagram illustrating a wireless communication interference and transmission collision between two different radio access technologies in accordance with some embodiments.

FIG. 6 illustrates an example of a wireless communication interference and transmission collision between a first radio access technology communication and a second radio access technology communication in accordance with some embodiments. For example, when a first sensor network and a second sensor network overlap and are set to use adjacent frequency bands, the wireless signals generate interference. In such an interference environment, there is a need for a scheme for avoiding interference in order to secure reliable wireless communication of the sensor networks.

Referring to the plot 600, the Y-axis denotes the frequency band, and the X-axis denotes the time of data (or packet) transmission. Furthermore, the first crosshatching 609 represents the area where a first radio access technology (RAT) data (or packet) is transmitted, and the second crosshatching 611 represents the area where a second radio access technology data (or packet) is transmitted.

In area 601, the RAT band 613 from the first RAT 609 and the RAT band 615 from the second RAT 611 overlap, but there is no mutual interference because the transmission times are different. As another example, the RAT band 617 from the first RAT 609 and the RAT band 619 from the second RAT 611 also overlap, but there is no mutual interference because the transmission times are different. By contrast, in area 605, the RAT band 621 from the first RAT 609 and the RAT band 623 from the second RAT 611 overlap and there is mutual interference because the transmission times also overlap. The mutual interference between the two RAT bands generates a data transmission error along with the transmission collision. Similarly, as another example, in area 607, the RAT band 625 from the first RAT 609 and the RAT band 627 from the second RAT 611 overlap and there is mutual interference because the transmission times also overlap.

Figure 7:
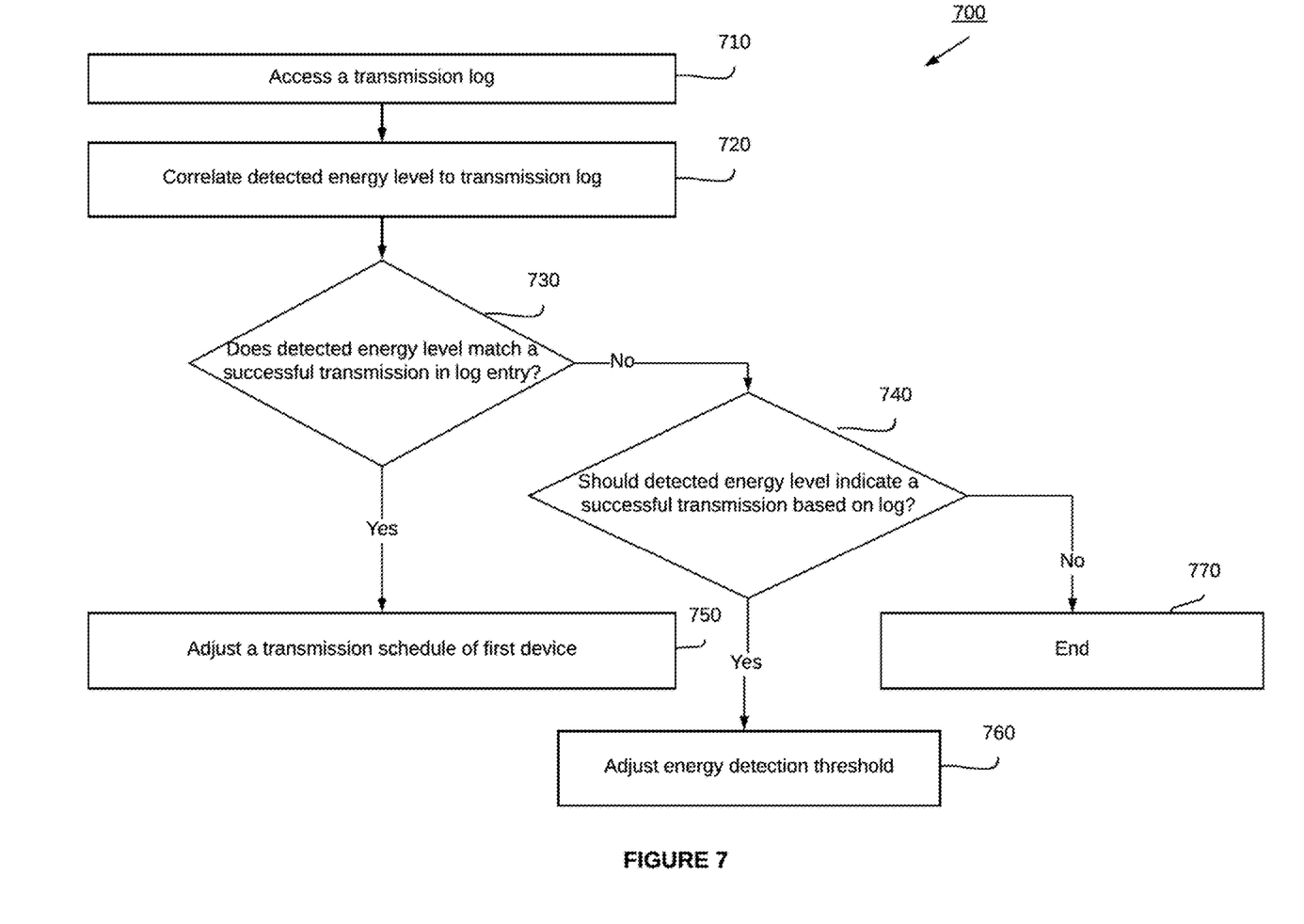
FIG. 7 is a flowchart representation of a method of using a transmission log to validate the detected energy levels in accordance with some embodiments.

FIG. 7 is a flowchart representation of a method 700 of using a transmission log to evaluate the efficiency of the energy detection method in accordance with some embodiments. In various embodiments, the method 700 is performed by a device with one or more processors and non-transitory memory such as a wireless AP 106 or 108 in FIG. 1 and FIG. 8. In some embodiments, the method 700 is performed with a transmission log in order to better recognize which energy detection levels correspond to successful transmissions and which energy detection levels correspond to failed transmissions. In some embodiments, the method 700 is implemented as a set of computer readable instructions that are executed at the wireless AP. Briefly, the method includes accessing a transmission log, correlating detected energy level to the transmission log, determining collisions between a first device and a second device based on the transmission log, and adjusting a transmission schedule of the first device or adjusting the energy detection threshold in accordance with whether the detected energy level matches a successful transmission in the transmission log.

To that end, as represented by block 710, in some embodiments, the method 700 includes accessing a transmission log. Those skilled in the art will appreciate that there are many ways of accessing a transmission log. For the sake of brevity, an exhaustive listing of all such methods of accessing a transmission log is not provided herein. In some embodiments, the transmission log contains information for a detected energy level that includes the detected energy level measured at the overlapping portion of the first and second channels, a frequency range, a timestamp, and a directionality parameter. In some embodiments, the transmission log is stored locally to a wireless AP or device that performs the method 700 and also remotely from the wireless AP or device performing the method 700.

As represented in block 720, in some embodiments the method 700 includes correlating a detected energy level at a time period with a successful or failed transmission from a transmission log. In various embodiments, correlating the detected energy level includes determining collisions between a first device and a second device. In some embodiments, the collisions are characterized by a concurrent transmission from both the first device and the second device. In some embodiments, this includes applying a timestamp in order to evaluate the efficiency of the detection method and its associated avoidance mechanisms. In some embodiments, the transmission log can be correlated with wireless protocol operations schedules. This allows a wireless AP to better recognize which detected energy levels actually correspond to an actual transmission. For instance, the wireless protocol operation schedules can confirm if the detected energy is a wireless protocol operation or not.

As represented by block 730, in various embodiments, the method 700 includes determining whether the detected energy level matches a successful transmission in the transmission logs.

As represented by block 750, in some embodiments, if the detected energy level matches a successful transmission entry from the transmission logs ("Yes" path from block 730), the method 700 includes adjusting a transmission schedule of a first device in order to avoid a collision or interference between the first device and the second device. In some embodiments, the detected energy level is added as a known energy detection signature for subsequent energy detections. In some embodiments, an energy detection signature may include the detected energy level and frequency range.

On the other hand, in some embodiments, if the detected energy level does not match a successful transmission ("No" path from block 730), the method 700 includes determining whether the detected energy level should indicate a successful transmission based on a schedule of wireless protocol operations represented by block 740. If the detected energy level should indicate a successful transmission based on a log (e.g., schedule of wireless protocol operations), then the method 700 proceeds to block 760, otherwise the method 700 ends.

As represented by block 760, in some embodiments, if the detected energy level should indicate a successful transmission based on the log (e.g., a schedule of wireless protocol operations) ("Yes" path from block 740), the method 700 includes adjusting the energy detection threshold where the detection happens. This informs the system that the energy detection was not sensitive enough and the energy detection threshold level should be adjusted. For example, a wireless LAN controller can send an energy detection threshold change instruction to the wireless AP. As another non-limiting example, the default energy detection threshold of −82 dBm can be changed to −85 dBm. In some embodiments, the energy detection threshold change can be incremental. For example, an energy detection fail algorithm may be run at intervals, and/or loss rate is associated with a "gentleness" parameter, as described in further detail in FIG. 5. For example, a less than 5% loss may result in adjusting an energy detection threshold of +3 dB and a loss between 5% and 10% may result in adjusting an energy detection threshold of +6 dB, etc. With reference to the example above, the process may also be learned in reverse. As such, if the 802.15.4 success rate is high, but Wi-Fi begins to fail, then the energy detection threshold is decreased by small increments.

As represented by block 770, in some embodiments, if the detected energy level should not indicate a successful transmission based on the log ("No" path from block 740) then the method 700 ends.

In some embodiments, the wireless AP takes one or more counter-measures or remedial actions in response to a determination that there is interference on the first channel. In some embodiments, an operation adjusts one or more antennas of the first device in order to emit the signal away from a second device. In some embodiments, an operation adjusts one or more antennas of the first device in order to emit the signal at a reduced power level. In some embodiments, an acceptable throughput level associated with the first channel is adjusted based on the detected energy level. For example, the energy detection threshold can be adapted or adjusted in order to improve efficiency and fairness when two different RATs share the same channel such that energy within an overlapping portion of a first and second channel from two different RATs may be accurately interpreted. This results in fairer time-sharing and fewer collisions and transmissions.

Figure 8:
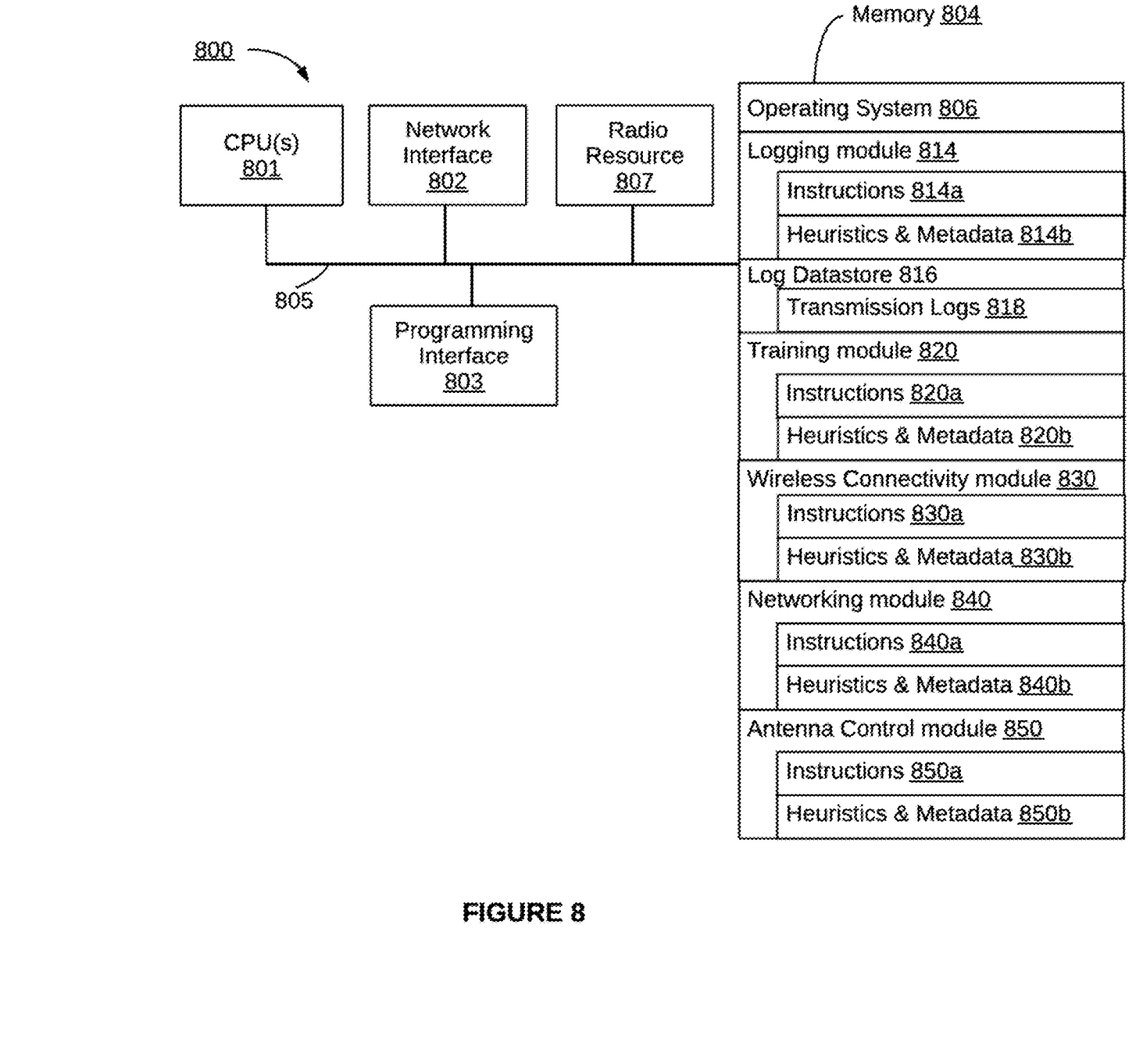
FIG. 8 is a block diagram of a wireless AP enabled with performing energy detection on a subset of a channel in accordance with some embodiments.

FIG. 8 is a block diagram of a wireless AP 800 enabled with one or more components of a device in accordance with some embodiments. While certain specific features are illustrated, those of ordinary skill in the art will appreciate from the present disclosure that various other features have not been illustrated for the sake of brevity, and so as not to obscure more pertinent aspects of the embodiments disclosed herein. To that end, as a non-limiting example, in some embodiments the wireless AP 800 includes one or more processing units (CPUs) 801, a network interface 802, a programming interface 803, a memory 804, a radio resource 807, and one or more communication buses 805 for interconnecting these and various other components.

In some embodiments, the one or more communication buses 805 include circuitry that interconnects and controls communications between system components. The memory 804 includes high-speed random access memory, such as DRAM, SRAM, DDR, RAM, or other random access solid state memory devices, and may include non-volatile memory, such as one or more magnetic disk storage devices, optical disk storage devices, flash memory devices, or other non-volatile solid state storage devices. The memory 804 optionally includes one or more storage devices remotely located from the one or more CPUs 801. The memory 804 comprises a non-transitory computer readable storage medium.

In some embodiments, the memory 804 or the non-transitory computer readable storage medium of the memory 804 stores the following programs, modules, and data structures, or a subset thereof including an optional operating system 806, a logging module 814, a log datastore 816, a training module 820, a wireless connectivity module 830, a wireless networking module 840 and an antenna control module 850. The operating system 806 includes procedures for handling various basic system services and for performing hardware dependent tasks.

In some embodiments, the radio resource 807 is provided to support and facilitate traffic bearing communications between the wireless access point 800 and one or more client devices (e.g., the wireless devices 110, 112, 114, 116, 118, 120, 122, 124 shown in FIG. 1). In some embodiments, the radio resource 807 includes a radio transceiver. For example, the radio transceiver operates according to IEEE 802.11b, IEEE 802.11g, IEEE 802.11n, IEEE 802.11ac, BLUETOOTH, ZIGBEE, or the like.

In some embodiments, the logging module 814 logs the energy detection measurements and maintains the transmission logs in a log datastore 816. In some embodiments, each log entry is time stamped. As described herein, in some embodiments, the logging module 814 ensures that local copies of the transmission logs 818 are synchronized with a local copy of the transmission logs 818 at other locations. To that end, in various embodiments, the logging module 814 includes a set of instructions and/or logic 814a, and heuristics and metadata 814b.

In some embodiments, the training module 820 determines collisions between a first device and a second device, and adjusts a transmission schedule of the first device, To that end, in various embodiments, the training module 820 includes a set of instructions and/or logic 820a, and heuristics and metadata 820b.

In some embodiments, the wireless connectivity module 830 is configured to provide wireless connectivity to a number of client devices (e.g., the wireless devices 110, 112, 114, 116, 118, 120, 122, 124 in FIG. 1) using the radio resource 807 operating according to any of a number of various wireless networking protocols such as IEEE 802.11b, IEEE 802.11g, IEEE 802.11n, IEEE 802.11ac, BLUETOOTH, ZIGBEE, or the like. To that end, in various embodiments, the wireless connectivity module 830 includes a set of instructions and/or logic 830a, and heuristics and metadata 830b.

In some embodiments, the networking module 840 is configured to route information between a network (e.g., the first coverage area 102 and the second coverage area 104 from FIG. 1) and the number of devices (e.g., the wireless devices 110, 112, 114, 116, 118, 120, 122, 124 in FIG. 1). To that end, the networking module 840 includes a set of instructions and/or logic 840a, and heuristics and metadata 840b.

In some embodiments, the antenna control module 850 adjusts the operation of one or more antennas in order to emit the signal away from a second device and adjusts the operation of the one or more antennas in order to emit the signal at a lower or reduced power level. To that end, in various embodiments, the antenna control module 850 includes a set of instructions and/or logic 850a, and heuristics and metadata 850b.

Although the logging module 814, the training module 820, the wireless connectivity module 830, the networking module 840, and the antenna control module 850 are illustrated as residing on a wireless AP 800, it should be understood that in other embodiments, any combination of the logging module 814, the training module 820, the wireless connectivity module 830, the networking module 840, and the antenna control module 850 may reside on a separate computing device.

Moreover, FIG. 8 is intended more as functional description of the various features which may be present in a particular embodiment as opposed to a structural schematic of the embodiments described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various embodiments. The actual number of modules and the division of particular functions and how features are allocated among them will vary from one embodiment to another and, in some embodiments, may depend in part on the particular combination of hardware, software, and/or firmware chosen for a particular embodiment.

While various aspects of embodiments within the scope of the appended claims are described above, it should be apparent that the various features of embodiments described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a first device including a wireless transceiver, one or more processors, and a non-transitory memory:
obtaining an indication of a mode selection, wherein the mode selection indicates a particular number of overlapping portions of a first channel and a second channel on which to perform energy detection;
adjusting one or more operating parameters of the first device based on the mode selection;
performing energy detection on the particular number of overlapping portions of the first channel and the second channel based on the mode selection, wherein the first channel has a first bandwidth and the second channel has a second bandwidth, wherein an overlapping portion of the first and second channels is smaller than the first bandwidth of the first channel, and wherein the energy detection is performed at a center frequency of the first channel;
determining whether a detected energy level from the energy detection satisfies a threshold, wherein the threshold characterizes an acceptable throughput level associated with the first channel; and
transmitting a signal over the first channel based on the threshold being satisfied.

2. The method of claim 1, wherein the first channel corresponds to a first radio access technology (RAT) and the second channel corresponds to a second RAT that is different from the first RAT.

3. The method of claim 1, wherein adjusting the one or more operating parameters includes selecting the acceptable throughput level associated with the first channel.

4. The method of claim 1, further comprising logging the detected energy level in a transmission log, wherein the detected energy level includes at least one of the detected energy level measured at the particular number of overlapping portions of the first and second channels, a frequency range, a timestamp, and a directionality parameter.

5. The method of claim 4, further comprising:
accessing the transmission log;
determining collisions between the first device and a second device based on the transmission log, wherein the collisions are characterized by a concurrent transmission from both the first device and the second device; and
adjusting a transmission schedule of the first device in accordance with whether there is a collision between the first device and the second device.

6. The method of claim 5, further comprising adjusting the acceptable throughput level associated with the first channel based on the detected energy level.

7. The method of claim 5, further comprising adjusting an operation of one or more antennas of the first device in order to emit the signal away from the second device.

8. The method of claim 5, further comprising adjusting an operation of one or more antennas of the first device in order to emit the signal at a lower power level.

9. A device comprising:
one or more processors;
a non-transitory memory; and
one or more programs stored in the non-transitory memory, which, when executed by the one or more processors, cause the device to:
obtain an indication of a mode selection, wherein the mode selection indicates a particular number of overlapping portions of a first channel and a second channel on which to perform energy detection;

adjust one or more operating parameters of the device based on the mode selection;

perform energy detection on the particular number of overlapping portions of the first channel and the second channel based on the mode selection, wherein the first channel has a first bandwidth and the second channel has a second bandwidth, wherein an overlapping portion of the first and second channels is smaller than the first bandwidth of the first channel, and wherein the energy detection is performed at a center frequency of the first channel;

determine whether a detected energy level from the energy detection satisfies a threshold, wherein the threshold characterizes an acceptable throughput level associated with the first channel; and transmit a signal over the first channel based on the threshold being satisfied.

10. The device of claim 9, wherein the first channel corresponds to a first RAT and the second channel corresponds to a second RAT that is different from the first RAT.

11. The device of claim 9, wherein adjusting the one or more operating parameters includes selecting the acceptable throughput level associated with the first channel.

12. The device of claim 9, wherein the one or more programs, when executed by the one or more processors further cause the device to log the detected energy level in a transmission log, wherein the detected energy level includes at least one of the detected energy level measured at the particular number of overlapping portions of the first and second channels, a frequency range, a timestamp, and a directionality parameter.

13. The device of claim 12, wherein the device is a first device and the one or more programs, when executed by the one or more processors further cause the first device to:

access the transmission log;

determine collisions between the first device and a second device based on the transmission log, wherein the collisions are characterized by a concurrent transmission from both the first device and the second device; and adjust a transmission schedule of the first device in accordance with whether there is a collision between the first device and the second device.

14. The device of claim 13, wherein the one or more programs, when executed by the one or more processors further cause the first device to adjust the acceptable throughput level associated with the first channel based on the detected energy level.

15. The device of claim 13, wherein the one or more programs, when executed by the one or more processors further cause the first device to adjust an operation of one or more antennas of the first device in order to emit the signal away from the second device.

16. The device of claim 13, wherein the one or more programs, when executed by the one or more processors further cause the device to adjust an operation of one or more antennas of the first device in order to emit the signal at a lower power level.

17. A non-transitory memory storing one or more programs, the one or more programs comprising instructions, which, when executed by one or more processors of a device, cause the device to:

obtain an indication of a mode selection, wherein the mode selection indicates a particular number of overlapping portions of a first channel and a second channel on which to perform energy detection;

adjust one or more operating parameters of the device based on the mode selection;

perform energy detection on the particular number of overlapping portions of the first channel and the second channel based on the mode selection, wherein the first channel has a first bandwidth and the second channel has a second bandwidth, wherein an overlapping portion of the first and second channels is smaller than the first bandwidth of the first channel, and wherein the energy detection is performed at a center frequency of the first channel;

determine whether a detected energy level from the energy detection satisfies a threshold, wherein the threshold characterizes an acceptable throughput level associated with the first channel; and transmit a signal over the first channel based on the threshold being satisfied.

18. The non-transitory memory of claim 17, wherein the first channel corresponds to a first radio access technology (RAT) and the second channel corresponds to a second RAT that is different from the first RAT.

19. The non-transitory memory of claim 17, wherein adjusting the one or more operating parameters includes selecting the acceptable throughput level associated with the first channel.

20. The non-transitory memory of claim 17, wherein the instructions, when executed by one or more processors of the device, further cause the device to log the detected energy level in a transmission log, wherein the detected energy level includes at least one of the detected energy level measured at the particular number of overlapping portions of the first and second channels, a frequency range, a timestamp, and a directionality parameter.

* * * * *